P. S. SIDELL.
JOINTER ATTACHMENT FOR PLOWS.
APPLICATION FILED JULY 1, 1909.
946,279.
Patented Jan. 11, 1910.
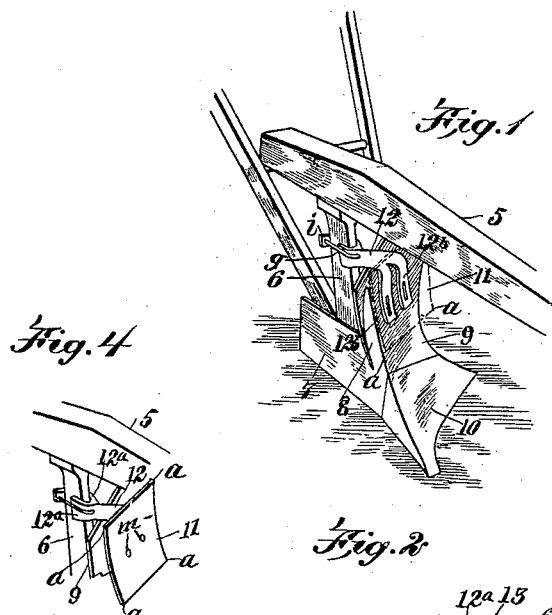
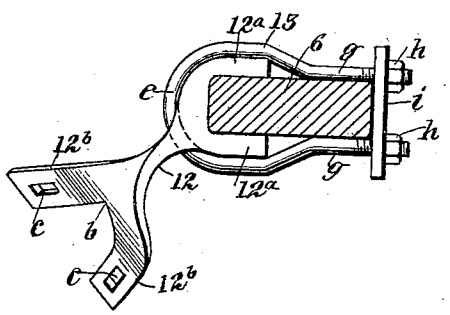
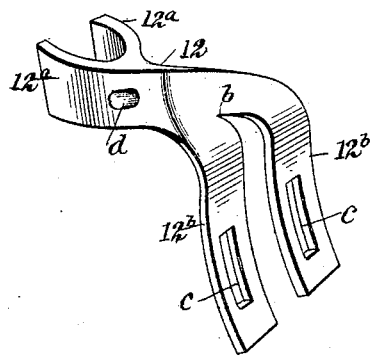
WITNESSES
INVENTOR
Philip S. Sidell
BY
ATTORNEYS

UNITED STATES PATENT OFFICE.

PHILIP S. SIDELL, OF SHREVE, OHIO.

JOINTER ATTACHMENT FOR PLOWS.

946,279.  Specification of Letters Patent.  Patented Jan. 11, 1910.

Application filed July 1, 1909.  Serial No. 505,375.

*To all whom it may concern:*

Be it known that I, PHILIP S. SIDELL, a citizen of the United States, and a resident of Shreve, in the county of Wayne and State of Ohio, have invented a new and Improved Jointer Attachment for Plows, of which the following is a full, clear, and exact description.

This invention relates to plows of a class that are adapted for sub-soil plowing, and also for cutting sod loose, and turning it as it is cut into the furrow made by the moving plow.

Usually a cutter blade, known as a jointer, is attached upon a plow beam, and depends therefrom in advance of the fixed colter, such an attachment being arranged for cutting sod and loose earth in advance of the plowshare and mold board.

The purpose of the invention is, to provide simple, novel means for detachably connecting a single or double pointed jointer blade, directly upon the standard of the plowshare and near to the mold board, forming an upward extension thereof, which will cut off vines, shear cut sod and turn such cut material as well as loose soil into the furrow formed by the progressive movement of the mold board and plowshare of the plow.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a perspective view of a plow and of the improvement mounted thereon, the jointer blade being indicated by dotted lines; Fig. 2 is an enlarged transverse sectional view of a plow standard, and a plan view of a detail of the invention mounted thereon; Fig. 3 is an enlarged perspective view of a bracket arm that is a main feature of the invention; and Fig. 4 is a perspective view of the improvement, mounted upon a plow standard shown partially, and connected with a portion of a plow beam.

In the drawings, 5 indicates a plow beam of any preferred construction, and 6 a downwardly-extended standard, that is secured by the upper end thereof upon the lower side of the plow beam, said standard being rectangular in cross section, as shown in Fig. 2.

Upon one side of the standard a land-side plate 7 is secured, and near the front edge of the standard 6 a colter blade 8 is positioned, that may be formed integral with the landside plate.

A mold board 9 is secured on the side of the standard 6, opposite from the landside plate 7, said mold board having the usual concave curvature outward and downward as it's projects rearwardly from the colter blade.

There is a plowshare 10, provided, of well known form, which is secured upon the mold board 9 and landside plate 7, having such concavity and shape of its lower edge as adapts it for penetrating the soil, and coacting with the mold board for turning a furrow of proper depth when the plow is in service.

The jointer blade employed for service as an adjunct of the colter 8 and mold board 9 may be in the form of a plate metal blank 11, that has four substantially parallel edges and four angular corners $a$, as is clearly shown in Fig. 4.

A dominant feature of the invention resides in the means employed for detachably connecting the jointer blade 11 with the standard 6, said means, as clearly shown in Figs. 2 and 3, consisting of an arm 12, that is longitudinally slotted at one end thereof, providing two spaced jaws $12^a$ that are adapted to closely embrace the body of the standard 6, when applied thereto from the front edge of the said standard. From a point near the junction of the jaws with the arm 12, said arm is curved downward and forward to a point $b$, where said arm is widened and bifurcated, providing two diverging members $12^b$ thereon. The limbs $12^b$ are curved sidewise, so as to closely fit upon the outer surface of the jointer blade 11, and in each limb $12^b$ a longitudinal slot $c$ is formed. In the arm 12, near the jaws $12^a$, a transverse perforation $d$ is formed, through which one limb of a looped clamp 13 is inserted, said clamp being disposed as shown in Fig. 2, having its bowed portion $e$ seated on the convex surface of the arm 12 near the jaws $12^a$, and the parallel members $g$, $g$ thereof having contact with the sides of the standard 6. The members $g$, $g$ extend beyond the rear edge of the standard 6, and are threaded for the reception of nuts $h$. A clamping bar $i$ having spaced perforations therein is mounted on the threaded portions of the members $g$, $g$, and on the latter are screwed the nuts $h$ which secure the clamping bracket arm upon the standard at a desired point. The jointer blade 11 is secured upon the convex rear sides of the limbs $12^b$ by bolts, that have countersunk heads, indicated at $m$ in Fig. 4, said bolts, that receive nuts on their threaded ends, pass through the slots $c$ in the limbs and clamp the limbs upon the jointer blade 11 by an adjustment of the nuts not shown.

It will be seen that by the means hereinbefore described, the jointer blade 11 may be secured a proper distance in front of the mold board 9 and have one of the lower corners $a$, on the side edge thereof that is above the landside plate 7, so positioned that it will cut the soil, or sod, if there is such, to be plowed under the ground.

The jointer blade may be adjusted for height in an obvious manner, and it serves as a colter as well as a supplementary mold board, for turning the upper portion of the soil as it is plowed, down into the furrow formed by the plow proper.

Having thus described my invention, I claim as new and desire to secure by Letters Patent:

1. In a device of the character described, the combination with a jointer blade, and a plow standard, of a bracket arm having two spaced members that are adjustably secured on the jointer blade, and a clamping device adapted for detachably securing the bracket arm on the plow standard.

2. In a device of the character described, the combination with a jointer blade having a concave front side and perforations therein, of a bracket arm having two members bent to have close contact with the concave side of the jointer blade, said members each having a longitudinal slot therein and bolts that pass through the slots and perforations, said bolts being adapted for clamping the members of the bracket arm upon the jointer blade.

3. In a device of the character described, the combination with a plow standard, and a concaved jointer blade, of a bracket arm, comprising two spaced jaws on one end of the arm which embrace the standard, a looped clamping bolt having two limbs that embrace the jaws and standard, means for securing the bolt limbs on the standard, two spaced plate-like members on the opposite end of the bracket arm, that are bent to fit upon the concave side of the jointer blade, said members each having a longitudinal slot therein, and bolts in said slots adapted for clamping the spaced members of the arm upon the jointer blade.

4. In a device of the character described, the bracket arm, comprising a body portion having two spaced parallel jaws on one end, and two plate-like members on the opposite end, spaced apart and bent downward and forward from the jaws, each member having a longitudinal slot therein.

5. In a device of the character described, the combination with the jointer and a plow standard, of a bracket arm comprising an arm slotted at one end for receiving the standard and having at the other spaced members adjustably connected with the blade, and means for clasping the arm on the standard.

In testimony whereof I have signed my name to this specification in the presence of two subscribing witnesses.

PHILIP S. SIDELL.

Witnesses:
C. W. Joss,
O. D. Bruce.